Aug. 27, 1957     W. PRATT     2,803,923
INDOOR PORTABLE GARDEN STAND
Filed Aug. 23, 1955
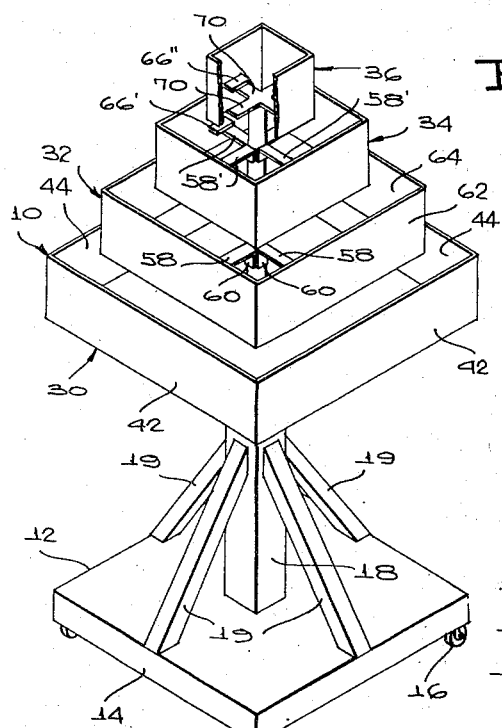
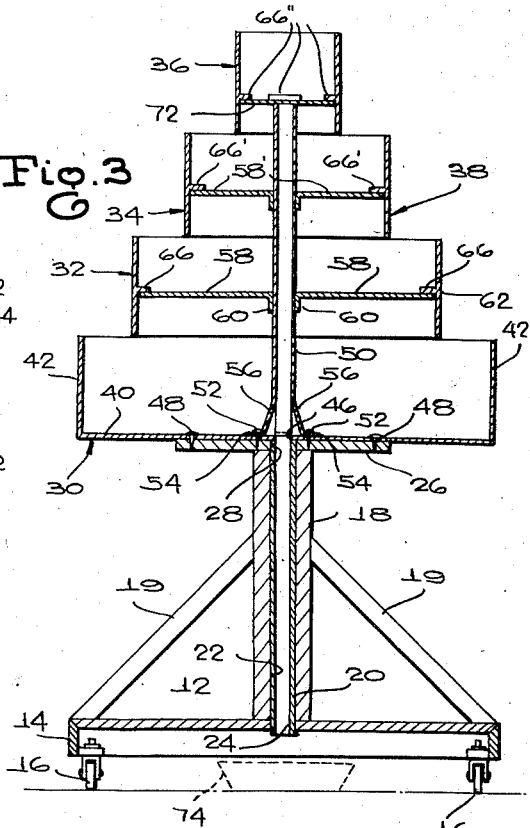
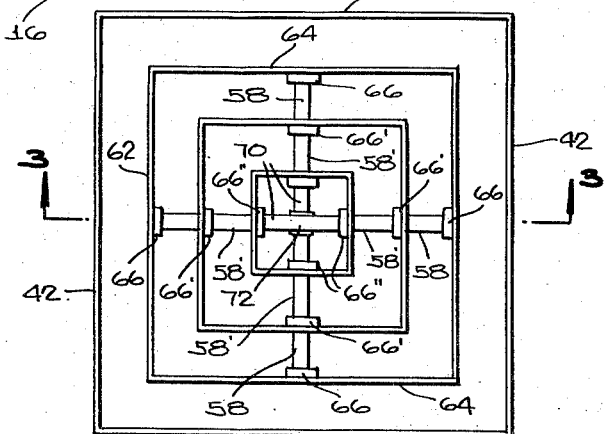
INVENTOR.
WESLEY PRATT
BY
McMorrow, Berman & Davidson
ATTORNEYS

2,803,923
INDOOR PORTABLE GARDEN STAND

Wesley Pratt, San Francisco, Calif.

Application August 23, 1955, Serial No. 530,017

2 Claims. (Cl. 47—39)

This invention relates to plant supports, and more particularly to a plant stand of the portable type.

It is an object of this invention to provide a garden stand in which a number of house plants and flowers may be grown indoors.

It is a further object of this invention to provide an indoor portable garden stand which permits the plant support to be spaced considerably above the supporting surface for the stand, so as to facilitate tending and care of the plants and flowers contained therein.

It is a still further object of this invention to provide an indoor portable garden stand whereby the plants may be arranged in tiers, and into which stand or plant support the soil may be placed, and drainage provided for the liquid sprinkled onto the plants and soil which would normally seep down to the bottom of the plant support.

It is yet another object of this invention to provide an indoor garden stand which may be moved within the house from location to location, so as to provide the most favorable light and sun conditions to insure successful plant culture, and which may be readily moved to the most desirable location within the house for purposes of decoration.

Other objects and advantages will become apparent from the following detailed description, forming the specification, and taken in conjunction with the accompanying drawings, in which:

Figure 1 is a perspective view of the portable garden stand embodying this invention;

Figure 2 is a top plan view of the device shown in Figure 1; and

Figure 3 is a cross sectional view taken on line 3—3 of Figure 2.

Referring to the drawings, the indoor portable garden stand of this invention is generally indicated at 10. The stand 10 is provided with a base 12 which is shown as being rectangular, but may be square, round, or of any other desirable shape, and may be made of wood or sheet metal or any other suitable material. The base 10 has a depending peripheral flange 14 to which is secured a plurality of casters 16, so that the base 12 is supported upon the wheeled casters 16.

Disposed centrally of the base 12 is an upstanding post 18 having a bore 20 extending centrally therethrough along its vertical axis, and the bore 20 has a sleeve 22 therein extending the entire length of the bore and at the lower end of the bore, the sleeve 22 extends through an opening 24 provided in the base 12, so that the sleeve 22 extends slightly below the lower surface of the base 12, but considerably above the supporting surface upon which the casters 16 rest. In effect, the sleeve 22 provides a lining for the bore 20 in the upstanding post 18.

A horizontal mounting plate 26 is centrally carried on the top of the post 18 and extends laterally therefrom perpendicularly to the vertical axis of the post 18. The sleeve 22 extends upwardly beyond the top end of the post 18 and is received in an opening 28 provided in the plate 26 and terminates flush with the top surface of the mounting plate 26. With regard to the post 18, it should be noted that, as shown, the post is generally square in cross section, however, the shape may be changed to any configuration desired, and also, in the present instance a plurality of support braces 19 are provided for the post 18 and extend from the respective sides of the post 18 intermediate its ends and secured at their other ends to the respective adjacent sides of the base 12 adjacent the peripheral edge thereof.

A plurality of walled structures 30, 32, 34 and 36 are carried by the mounting plate 26, the walled structures being in superposed relation with the succeeding walled structures being of diminishing dimensions so as to provide a tiered or stepped plant support generally indicated by the reference numeral 38. As will be apparent from inspection of Figure 2, the lower edge of the walled structures 34 and 36 is flush with the upper edge of the adjacent one of said structures with the lower edge of the structure 32 being flush with the upper edge of the walled structure 30.

Considering first the walled structure 30, it will be seen that there is provided a bottom wall 40 which, in the present case, is shown as being of square outline, but may be formed as a rectangle or be made circular in form without departing from the scope of this invention. The walled structure 30 is further provided with pairs of spaced parallel side walls 42 and 44 extending perpendicularly above the bottom wall 30 and formed integrally therewith about the periphery of the bottom wall 40. The bottom wall 40 is further provided with a central aperture 46 extending therethrough and in communication with the sleeve 22 in the bore 20 of the post 18. As shown in Figure 3, the bottom wall 40 is mounted upon the plate 26 and secured thereto as by screws 48. The walled structure 30 is so carried by the mounting plate 26 as to be symmetrical therewith and extends a considerable distance beyond the periphery of the mounting plate 26.

An upstanding hollow standard 50 is secured at its lower end to the bottom wall 40 and the mounting plate 26 as by screws or rivets 52 passing through horizontally disposed feet 54 formed at the end of angularly disposed legs 56 formed from the lower end of the standard 50 by a plurality of equally spaced cuts being made therein and the legs 56 bent outwardly from the vertical plane of the standard. The standard 50 is disposed centrally of the walled structure 30 and its hollow interior is in communication with the bore 20 of the post 18, since the interior of the standard 50 is in registry with the aperture 46 and the opening 28, and since the legs 56 are provided by cutting slits into the lower end of the standard and thence outwardly therefrom, an opening between each of the legs 56 will result so that the interior of the walled structure 30 is in communication with the bore 20 through the openings defined between the legs 56 and the registering openings or apertures 46 and 28.

At spaced intervals along the standard 50 and intermediate its ends, there is provided at each of these locations a walled structure support which comprises a plurality of laterally extending arms 58 having down-turned flanges 60 perpendicular to the horizontal plane of the arm 58 and engaging the outer surface of the standard 50, so that each of the arms 58 may be secured to the standard 50 by fastening the depending flange 60 thereto by any suitable means, in the present case, the standard 50 being preferably formed of sheet material and being either square or tubular in shape, and the arms 58 being of suitable narrow strap metallic material, the flanges 60 may be secured by welding or brazing. In this connection, the walled structures 30 to 36 may be formed of sheet metal or of a suitable plastic material, and the standard 50 and the support arms 58 may also be formed of a suitable plastic material.

As best seen in Figure 1, the arms 58 extend laterally from the standard 50 perpendicularly to the vertical axis of the standard, and are equidistantly spaced about the standard at each of its locations therealong, so that each of the arms 58 has its center line separated by ninety degrees from the adjacent arms at each location.

The walled structure 32 comprises a rectangular frame having open top and bottom and formed from opposed spaced parallel side walls 62 and 64. The height of each of the side walls may be approximately the same as the side walls 42 and 44 of the walled structure 30, however, the length of each of these side walls is of a lesser dimension than the length of the side walls of the walled structure 30, and the structure 32 is disposed symmetrically with respect to the structure 30. Each of the side walls 62 and 64 of the walled structure 32 is provided centrally intermediate its length at a location centrally intermediate the height of the walls with a laterally projecting ear or lug 66 which is adapted to rest upon the end of an associated arm 58 at the end of the arm remote from the post or standard 50, so that on each of the side walls of the structure 32 an ear or lug 66 will rest upon the end of the respective arm 58, thereby supporting the walled structure 32 above the walled structure 30 in symmetrical superposed relation thereto.

The walled structure 34 is similar in all respects to the walled structure 32, except that the length of each of the side walls is of a lesser dimension than the length of the side walls 62 and 64 of the structure 32. The structure 34 will be supported upon a wall support structure similar to the support for the structure 32, and in the case of the walled structure 34, ears or lugs 66' will rest upon the ends of support arms 58' secured to the standard 50 at a location above the location of the arms 58 and secured to the standard 50 in the same manner as the arms 58 are secured thereto. So that, it will be seen that the walled structure 34 is supported in superposed relation to the structure 32 and spaced thereabove.

The walled structure 36 is similar to the walled structures 32 and 34, but the side walls thereof are of a lesser dimension than the side walls of the structure 34. The structure 36 is provided with laterally projecting ears or lugs 66" similarly disposed to the ears 66 and 66' and adapted to rest upon the radially extending arms 70 of a spider 72 secured on the top of the standard 50.

The structure thus far defined generally sets forth a garden stand having a wheeled base carrying centrally thereon an upstanding post with a central bore longitudinally through the post, the bore being provided with an internal sleeve which extends upwardly beyond the post and through an opening provided in a support or mounting plate carried on the top of the post, a walled structure carried upon the post and mounting plate, and an upstanding standard also carried by the mounting plate and post, the standard providing support means at locations spaced therealong whereby a walled structure may be carried thereby with the walled structures in superposed relation, each of the succeeding walled structures being of diminishing dimensions, so that a tiered or stepped plant support is provided. In addition, the interior of the walled structure 30 is in communication through openings between the legs 56 at the lower end of the standard 50 with the bore 20 in the post 18.

With the foregoing in mind, soil will be placed in the walled structures so as to be contained therein and the plants to be grown in this soil will be placed in the soil in each of the structures between the periphery of the next succeeding superposed structure and the periphery of the walled structure itself, so that a tiered or stepped effect of plants or flowers will result. In addition, as the plants are watered, and the water filters down through the successive walled structures 36, 34, 32 and 30, any excess water or liquid will be drained through the openings provided between the legs 56 and downwardly through the bore 20, and this excess water emerging from the lower end of the sleeve 22 in the bore 20 may be contained by a pan or dish 74 placed on the supporting surface from which the wheeled casters 16 rest and below the base 12. The pan 74 may, of course, be periodically emptied after the plants in the plant support portion of the stand have been watered and the water has seeped through and drained into the pan or dish 74.

In essence, the device of the present invention comprises two principal components, namely, the stand structure which includes the wheeled base 12, the upstanding post 18, and the mounting plate 26, and the plant support carried upon the stand structure, the plant support comprising the walled structure 30, the hollow standard 50 and the structures 32, 34 and 36 carried in superposed relation upon the standard 50.

Drainage means for the plant stand is provided by the openings between the legs 56 of the standard 50, the registering openings 46 and 28, the bore 20 and the opening 24 in the base 12.

While there is shown and described the preferred embodiment of the invention, it is to be understood that the structure is susceptible to change and modification within the practicability of the invention and, therefore, should be limited only by the scope of the claims appended hereto.

What is claimed is:

1. An indoor portable garden stand comprising a wheeled base having an opening therein, an upstanding post having a central longitudinal bore therethrough carried upon said base with said bore registering with said opening, a horizontally disposed mounting plate having an aperture therein in register with said bore, said plate carried on the top of said post and secured thereto, a walled structure having a bottom wall provided with an opening therein in register with said aperture and said bore, an upstanding hollow standard secured to said bottom wall and having openings provided at the lower end thereof in communication with the opening in said bottom wall, support means carried by said standard at locations spaced therealong, each of said support means embodying a plurality of arms projecting laterally exteriorly of said standard and lying in the same horizontal plane, other walled structures having an open top and bottom and being of diminishing peripheral dimension and of lesser dimension than the first mentioned walled structure positioned in superimposed spaced relation about said standard with the lower edge of each of said other structures other than the lowermost one of said other structures being flush with the upper edge of the adjacent one of said other structures and the lower edge of the lowermost one of said other structures being flush with the upper edge of the first mentioned walled structure, and a plurality of ears arranged in spaced relation about the interior of each of said other walled structures intermediate the top and bottom thereof and carried by said walled structure, the ears of each of said other walled structures resting upon the arms of the adjacent support means to thereby support said walled structure upon said support means, said first mentioned walled structure and said other walled structures defining a stepped plant support into which soil may be contained for the growing of plants indoors; and the openings in said standard, the opening in said bottom wall, the aperture in said plate, the bore in said post and the opening in said base defining a drain for liquid seeping through the soil in the plant support.

2. An indoor portable garden stand comprising a wheeled base having an opening therein, an upstanding post having a central longitudinal bore therethrough carried upon said base with said bore registering with said opening, a horizontally disposed mounting plate having an aperture therein in register with said bore, said plate carried on the top of said post and secured thereto, a walled structure having a bottom wall provided with an opening therein in register with said aperture and said bore, an upstanding hollow standard secured to said bottom wall and having openings provided at the lower end thereof in communication with the opening in said bottom wall, support means carried by said standard at locations spaced therealong, each of said support means embodying a plurality of arms projecting laterally exteriorly of said standard and lying in the same horizontal plane, other walled structures having an open top and bottom and being of diminishing peripheral dimension and of lesser dimension than the first mentioned walled structure positioned in superimposed spaced relation about said standard with the lower edge of each of said other structures other than the lowermost one of said other structures being flush with the upper edge of the adjacent one of said other structures and the lower edge of the lowermost one of said other structures being flush with the upper edge of the first mentioned walled structure, and a plurality of ears arranged in spaced relation about the interior of each of said other walled structures intermediate the top and bottom thereof and carried by said walled structure, the ears of each of said other walled structures resting upon the arms of the adjacent support means to thereby support said walled structure upon said support means, said first mentioned walled structure and said other walled structures defining a stepped plant support into which soil may be contained for the growing of plants indoors; and the openings in said standard, the opening in said bottom wall, the aperture in said plate, the bore in said post and the opening in said base defining a drain for liquid seeping through the soil in the plant support, a sleeve in the bore in said post extending through the opening in said base and into the registering aperture in said plate and opening in said bottom wall.

References Cited in the file of this patent
UNITED STATES PATENTS

| | | |
|---|---|---|
| 163,417 | Slocum | May 18, 1875 |
| 283,840 | Westphal | Aug. 28, 1883 |
| 613,986 | Gadbury | Nov. 8, 1898 |
| 1,928,799 | Stevens | Oct. 3, 1933 |
| 2,003,986 | Witthuhn | June 4, 1935 |